United States Patent [19]

Kitahata et al.

[11] Patent Number: 4,677,024
[45] Date of Patent: Jun. 30, 1987

[54] MAGNETIC RECORDING MEDIUM

[75] Inventors: Shinichi Kitahata; Mikio Kishimoto, both of Mishima, Japan

[73] Assignee: Hitachi Maxell, Ltd., Osaka, Japan

[21] Appl. No.: 671,961

[22] Filed: Nov. 16, 1984

[30] Foreign Application Priority Data

Nov. 17, 1983 [JP] Japan .................... 58-217273

[51] Int. Cl.$^4$ .......................... G11B 5/68; G11B 5/70
[52] U.S. Cl. .................................. 428/328; 427/128; 252/62.54; 428/900; 428/694
[58] Field of Search ................ 428/694, 328, 900; 427/128; 252/62.54

[56] References Cited

U.S. PATENT DOCUMENTS

| | | | |
|---|---|---|---|
| 3,694,261 | 9/1972 | Makino et al. | 428/694 |
| 4,442,159 | 4/1984 | Dezawa et al. | 428/694 X |
| 4,451,535 | 5/1984 | Pinguad et al. | 428/694 X |
| 4,457,982 | 7/1984 | Rudolf et al. | 428/694 X |
| 4,465,735 | 8/1984 | Togawa et al. | 428/694 X |
| 4,511,617 | 4/1985 | Hideyama et al. | 428/328 X |

*Primary Examiner*—Nancy A. Swisher
*Attorney, Agent, or Firm*—Birch, Stewart, Kolasch & Birch

[57] ABSTRACT

Magnetic recording medium comprising a magnetic layer formed by magnetic powder including acicular magnetic powder with the magnetic anisotropy to be oriented perpendicular to the acicular direction which is oriented in parallel with the magnetic layer.

2 Claims, No Drawings

MAGNETIC RECORDING MEDIUM

FIELD OF THE INVENTION

The present invention relates to a magnetic recording medium.

BACKGROUND OF THE INVENTION

In order to improve the recording characteristics of a magnetic recording medium, it is generally accepted to orient the acicular magnetic powder included in the magnetic layers in a horizontal direction or a longitudinal direction. However, according to the method of using the magnetizing component in a longitudinal direction of the magnetic layers as described above, there is an upper limit of the recording density, whereby the demagnetizing field increases in the magnetic recording medium as the recording density is increased, and in turn there occurs decrement and rotation of the residual magnetization or remanence, and as a result, it becomes difficult to read out the signals recorded in the magnetic recording medium correctly.

On the other hand, a so called vertical magnetic recording in which the magnetic recording is effected in the vertical direction of the recording medium using the magnetic component of vertical or perpendicular to the surface of the magnetic layer is suitable for a high density magnetic recording since the effect of the demagnetizing field is small as the recording density is increased, so that there is a number of approaches to use the vertical magnetic recording. One approach is such that the magnetic powder, each grain having anisotropy in the acicular direction, is so distributed in the recording layers that the magnetic field is oriented in the direction perpendicular to the surface of the magnetic layer so as to use the vertical magnetization component. Another approach is such that barium ferrite powder, each having a hexagonal plate like shape with the magnetic anisotropy perpendicular to the surface of the plate, is used as the magnetic powder with the surface of the hexagonal plate oriented parallel to the magnetic layers thereby using the vertical magnetization component. In the former way, the acicular magnetic powder is apt to fall in parallel to the surface of the magnetic layer during dry process of the magnetic coating layer on the substrate material thereby reducing the vertical magnetization component. In the latter way, the respective magnetic powder tends to be condensed together in the process of orientation of the surfaces of the plates in the direction of the surface of the magnetic layer, whereby it is difficult to make the magnetic layers with an excellent smooth surface and therefore, it is difficult to record the information on the recording medium with a high recording density.

SUMMARY OF THE INVENTION

An essential object of the present invention is to provide a magnetic recording medium which enables recording of information at a high recording density.

As the result of study for eliminating the above mentioned drawbacks inherent in conventional vertical magnetic recording, it has been found that by using an acicular magnetic powder wherein the direction of the magnetic anisotropy is perpendicular to the acicular direction thereby causing the acicular direction of the magnetic powder to be oriented in the horizontal direction relative to the surface of the horizontal magnetic layers, magnetic layers having good magnetization components in the vertical direction and a good magnetic orientation with a smoothed layer surface of high accuracy suitable for a high density magnetic recording can be prepared.

DETAILED DESCRIPTION

According to the present invention, preferably acicular magnetic powder having the magnetization anisotropic perpendicular or vertical to the acicular direction may be used as the magnetic powder and preferably planer ferrite powder with an acicular type of hexagonal system represented by the general formulas (1), (2) and (3) may be used.

$$2MO \cdot AO \cdot 8Fe_2O_3 \quad (1)$$

$$2MO \cdot 2AO \cdot 12Fe_2O_3 \quad (2)$$

$$2MO \cdot 3AO \cdot 12Fe_2O_3 \quad (3)$$

In the above formulas, M is selected from the group consisting of Mn, Co, Zn, Ni, Mg and Fe and a mixture thereof and A is selected from the group consisting of Ba, Sr, Pb and Ca and a mixture thereof.

The planer type ferrite mentioned above can be manufactured in such a manner that acicular $\alpha$-$Fe_2O_3$, a carbonate of Ba, Sr, Pb or Ca and a carbonate of Mn, Co, Zn, Ni, Mg or Fe are used as raw materials and suitable amounts of the materials defined according to the composition of the hexagonal system ferrite are mixed in a humid bowl mill for several hours. Subsequently the mixture is taken out of the bowl mill, water is vaporized and subsequently, the materials are sintered in a maffle's furnace at a temperature of 800° through 1000° C. for 24 hours.

The hexagonal ferrite system manufactured in the manner as described above has the same acicular shape as in the $\alpha$-$Fe_{23}$ with the crystaline axis coinciding with the C axis (acicular direction) of the $\alpha$-$Fe_2O_3$ and is planer type with the magnetic anisotropy oriented in the plane perpendicular to the C axis of the crystalline. By using the magnetic powder having acicular shape with the magnetic anisotropy oriented in the direction perpendicular to the acicular direction, such as planer type ferrite manufactured as mentioned above, the magnetic coating material including the magnetic powder of the above kind is coated on the substrate with the acicular axis oriented in parallel to the horizontal surface of the magnetic layer, whereby the direction of the magnetic anisotropy is oriented perpendicular to the surface of the magnetic layer resulting in obtaining the magnetic layer having a large amount of the vertical magnetization components, so that there can be obtained the magnetic recording medium which enables a vertical magnetic recording of high fidelity and suitable for a high recording density. In addition, the magnetic powder thus obtained has an acicular configuration with the orientation parallel to the surface of the magnetic layer, so that the recording medium thus obtained according to the present invention shows good orientation and is provided with a smooth surface of magnetic layer of high accuracy thereby effecting a short wave recording with high quality.

Preferably the grain diameter of the acicular magnetic powder with the magnetic anisotropy oriented perpendicular to the acicular direction is smaller than 0.5 micrometer in terms of the long axis and the axis ratio (long axis diameter/short axis diameter) is preferably more than 5. Where the grain diameter is larger than 0.5 micrometer and/or the axis ratio is smaller than 5, the smoothness of the surface of the magnetic layer is bad and therefore, a high recording density can not be expected.

Preferably the coercive force of the magnetic powder is in the range of 200 through 2000 oersted. Where the coercive force is lower than 200 oersted, a high density recording can not be expected, whereas where the magnetic powder has a coercive force of more than 2000 oersted the magnetic layer is not suitable as the recording medium.

The magnetic coating material including the magnetic acicular powder, with the magnetic anisotropy being in the plane perpendicular to the acicular direction, is coated on the substrate to provide the magnetic recording medium. Thereafter a magnetic field is applied to the recording medium for magnetic orientation in the direction perpendicular to the surface of the magnetic layer of the recording medium so that the magnetizable axes can be oriented in the vertical direction and the surface of the magnetic layer is made smooth.

In place of application of the magnetic field, application of a mechanical shearing force to the recording medium during coating of the magnetic coating material on the substrate causes the acicular direction of the magnetic powder to be oriented in the direction parallel to the surface of the magnetic layer whereby it is possible to orient the magnetizing axes in the direction perpendicular to the surface of the magnetic layer.

The recording medium made in the manner described above includes a vertical magnetic recording disc, magnetic tape and so on.

In preparing the magnetic coating materials, as the bonding materials co-polymers of vinyl chloride and vinyl acetate, polyvinylbutyral resin, cellulose, polyurethane resin, isocyanate compounds and/or radiation cured resin can be used.

As organic solvents, conventional organic solvent such as toluene, methyl ethyl ketone, methyl isobutyl ketone, cyclohexanol, tetrahydrofuran, and/or ethyl acetate or a mixture of more than two kinds of solvent materials can be used.

There may be included various conventional additives such as dispenser, lubricant additives, grinding agents and antistatic agents in the magnetic coating materials.

PREFERRED EMBODIMENTS

Examples of the magnetic recording medium according to the present invention will be described hereinafter.

EXAMPLE 1

There was prepared a mixture in which 15.4 weight of $BaCO_3$ and 19.0 weight of $CoCO_3.3Co(OH)_2.5H_2O$ are added to 100 weight of acicular powder of $\alpha$-$Fe_2O_3$ with the long axis length 0.25 micrometers, axial diameter ratio (long axis diameter/short axis diameter) of 8. After agitation of the mixture in a humid bowl mill for several hours, the mixture was taken out of the bowl mill and the water was vapored, subsequently, the mixture was cintered in a muffle's furnace at 900° C. for 24 hours, whereby hexagonal system Ba ferrite magnetic powder was obtained. The hexagonal system Ba ferrite magnetic powder holds the shape of the $\alpha$-$FE_2O_3$ powder as the raw materials and has the coercive force of 1250 cerated and the saturate magnetization of 61 emu/g.

Using the hexagonal system Ba ferrite magnetic powder, there were prepared the compounds consisting of:

| | |
|---|---|
| hexagonal system Ba ferrite magnetic powder | 1000 weight |
| VAGH (copolymers of vinylchloride and vinyl acetate alcohol manufactured by U.C.C. in U.S.A.) | 137.5 weight |
| PANDEX T5201 (polyurethane resin produced by DAINIPPON INK KAGAKU KOGYO CO.) | 87.5 weight |
| KORONATE L (Trifunctional low molecular isocyanate compounds produced by NIPPON POLYURETHANE KOGYO CO.) | 25 weight |
| $Cr_2O_3$ powder | 15 weight |
| lauric acid | 20 weight |
| fluidized paraffin | 2 weight |
| methylisobtylketone | 800 weight |
| toluene | 800 weight |

The compounds as described above were mixed and dispersed in the bowl mill for three days and the magnetic coating materials prepared. The magnetic coating materials were coated on the substrate of a polyester base film of 12 micrometer thick applying a magnetic field of 3000 oersted in the direction perpendicular to the surface of the substrate, whereby the substrate on which the magnetic materials were coated was dried then the magnetic recording medium having the magnetic layer of 4 micrometer thick after dried was produced. Then the surface of the recording medium was smoothed and cut into the recording tape with a suitable width.

EXAMPLE 2

Hexagonal system Ba ferrite powder was prepared a similar manner as described in the EXAMPLE 1 but the amount of $BaCO_3$ was changed to 41.2 weight from 15.4 weight and the amount of $CoCO_3.3Co (OH)_2.5H_2O$ was changed to 25.4 weight from 19.0 weight, having the coercive force of 1100 oersted and the saturate magnetization of 55 emu/g, whereby a recording tape was produced.

COMPARATIVE EXAMPLE 1

A magnetic recording tape was prepared in a similar manner as described in the EXAMPLE 1 using hexagonal plate Ba ferrite magnetic powder with the grain diameter of 0.3 micrometers, the coercive force of 1200 oersted and the saturate magnetization of 52 emu/g in place of the hexagonal system Ba ferrite magnetic powder.

COMPARATIVE EXAMPLE 2

A recording tape was prepared in a similar manner as described in the EXAMPLE 1 using cobalt included iron oxide magnetic powder of the grain diameter of 0.25 micrometers, the axial ratio of 8, coercive force of 1200 oersted and saturation magnetization of 70 emu/g in place of hexagonal system Ba ferrite magnetic powder.

Measurement was made about the respective magnetic tapes of the examples 1 and 2 and the comparative examples 1 and 2 in terms of the coercive force, the squareness ratio in the vertical direction, the squareness ration in the longitudinal direction and roughness of the surface of the magnetic surface of the tape. Also, the maximum output level of in the various recording wave lengths was measured. As to the roughness of the magnetic surface, the average roughness on the center line of the tape was measured with cut off of 0.8 mm by a roughness meter of prove touch type made by TOKYO SEIMITSU KABUSHIKI KAISHA. The vertical squareness ratio was measured by depicting the histerisys curve on the B-H graph by assuming that there was a demagnetizing field of $4\pi Br$ and in turn demagnetizing field was compensated. The result of the measurement is represented in the TABLE.

TABLE

|  | EX 1 | EX 2 | COMP 1 | COMP 2 |
|---|---|---|---|---|
| VERTICAL COERCIVE FORCE Hc (Oe) | 1350 | 1200 | 1250 | 1280 |
| VERTICAL SQUARENESS RATIO Br/Bs | 0.68 | 0.69 | 0.68 | 0.66 |
| LONGITUDINAL SQUARENESS RATIO Br/Bs | 0.47 | 0.46 | 0.58 | 0.52 |
| SURFACE ROUGHNESS micrometer | 0.05 | 0.05 | above 0.2 | above 0.2 |
| MAX. OUTPUT LEVEL (DB) |  |  |  |  |
| WAVE LENGTH 1 micrometer | +0.2 | +0.2 | 0 | −0.5 |
| WAVE LENGTH .75 micrometer | +0.6 | +0.4 | 0 | −0.7 |
| WAVE LENGTH .5 micrometer | +0.7 | +0.5 | 0 | −0.8 |

As apparent from the TABLE, the magnetic recording tape (examples 1 and 2 referred to as EX 1 and EX 2 in the table) according to the present invention is the coercive force and the squareness in the vertical direction are the same or higher than those of the conventional recording tape (comparative examples 1 and 2 referred to as COMP. 1 and COMP. 2 in the table) although the squareness in the longitudinal direction of the tape is decreased. In addition, the surface roughness of the recording layer is decreased and the maximum output level is high over all frequency range and particularly the output level is higher in the short wave length range. Thus, it is apparent that the recording medium according to the present invention has a good surface smoothness and is suitable for the high density recording.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a substrate having a magnetic layer coated thereon, said magnetic layer comprising a needle-shaped magnetic powder in a binder with the magnetic anisotropy of said powder being in a direction perpendicular to the longitudinal axis of the needle-shaped powder, said longitudinal axis being in the plane parallel to the magnetic layer.

2. The magnetic recording medium according to claim 1, wherein the grain diameter of the acicular magnetic powder is less than 0.5 micrometer with the axis ratio being greater than 5.

3. The magnetic recording medium according to claim 1, wherein the grain diameter of the needle-shaped magnetic powder is less than 0.5 micrometer with the axis ratio being greater than 5.

* * * * *